United States Patent [19]

Bolzer et al.

[11] Patent Number: 4,525,366

[45] Date of Patent: Jun. 25, 1985

[54] PROCESS FOR TREATING A MILK SERUM PRODUCT

[75] Inventors: René J. M. Bolzer, Brece; Jean Clanchin, Noyal sur Vilaine, both of France

[73] Assignee: Laiterie Triballat, Noyal sur Vilaine, France

[21] Appl. No.: 488,446

[22] Filed: Apr. 25, 1983

[30] Foreign Application Priority Data

Apr. 29, 1982 [FR] France ............................. 82 07402

[51] Int. Cl.$^3$ ............................................. A23C 9/14
[52] U.S. Cl. .................................... 426/271; 426/491; 426/583
[58] Field of Search ............... 426/271, 580, 583, 657, 426/491, 495, 41; 260/122

[56] References Cited

U.S. PATENT DOCUMENTS

| | | | |
|---|---|---|---|
| 2,606,181 | 8/1952 | Pratt et al. | 426/41 X |
| 3,423,208 | 1/1969 | Kuipers | 426/271 |
| 3,922,375 | 11/1975 | Dalan et al. | 426/491 X |
| 3,930,039 | 12/1975 | Kuipers | 426/491 X |
| 3,956,520 | 5/1976 | Aiello | 426/491 X |
| 4,352,828 | 10/1982 | Rialland et al. | 426/491 X |
| 4,423,081 | 12/1983 | Salmon | 426/491 X |

OTHER PUBLICATIONS

Journal of Dairy Science, vol. 58, No. 5, 1975, p. 782.

*Primary Examiner*—Arthur L. Corbin
*Attorney, Agent, or Firm*—Pearne, Gordon, Sessions, McCoy, Granger & Tilberry

[57] ABSTRACT

A milk serum product is delipidated and freed from microorganisms by adjusting the pH of the milk serum product to 4.3–5.0, causing coagulation in the pH adjusted milk serum product by heating it and adding milk casein substance thereto, and then separating coagulated material from the treated milk serum product.

7 Claims, 2 Drawing Figures

PROCESS FOR TREATING A MILK SERUM PRODUCT

This invention relates to processes for treating a milk serum product and to the protein products obtained therefrom.

The term "milk serum products" in this specification refers mainly to milk serum or whey but also to the residues from ultrafiltration of milk serum.

BACKGROUND OF THE INVENTION

The coagulation of milk, which is effected under all sorts of conditions depending on the nature of the cheeses which are to be prepared, produces not only a casein coagulum but also milk serum, the characteristics of the composition of which vary as a function of numerous parameters such as the source of the milk and the treatment which it has undergone.

Generally, the coagulum is separated from the milk serum, and this serum is then processed by subjecting it to various treatments, including ultrafiltration, to prepare useful milk serum proteins, more particularly as ingredients for dietetic foods.

The residue should contain as few lipids as possible, particularly if protein-enriched foods are to be prepared. During ultrafiltration, lipoproteins accumulate and form part of what is referred to as a dynamic membrane which lowers the permeation flow rates and makes it more difficult to clean the apparatus afterwards. In some cases there is also a detrimental increase in viscosity and a reduction in foaming power and stability.

All the solutions proposed up till now for reducing the lipid content of the milk serum, such as microfiltration, demineralisation followed by heat treatment and heating to elevated temperature, are laborious and not very effective.

SUMMARY OF THE INVENTION

The invention sets out to provide a process for treating milk serum in order to free it from lipids and eliminate microorganisms which is simple to carry out and control and therefore very reliable and which does not lead to any loss of protein substances with a consequent reduction of yield. The instantaneous flow rate of ultrafiltration is increased by at least 30% and is maintained in the course of time.

DESCRIPTION OF THE PREFERRED EMBODIMENT

Figures 1, 2:
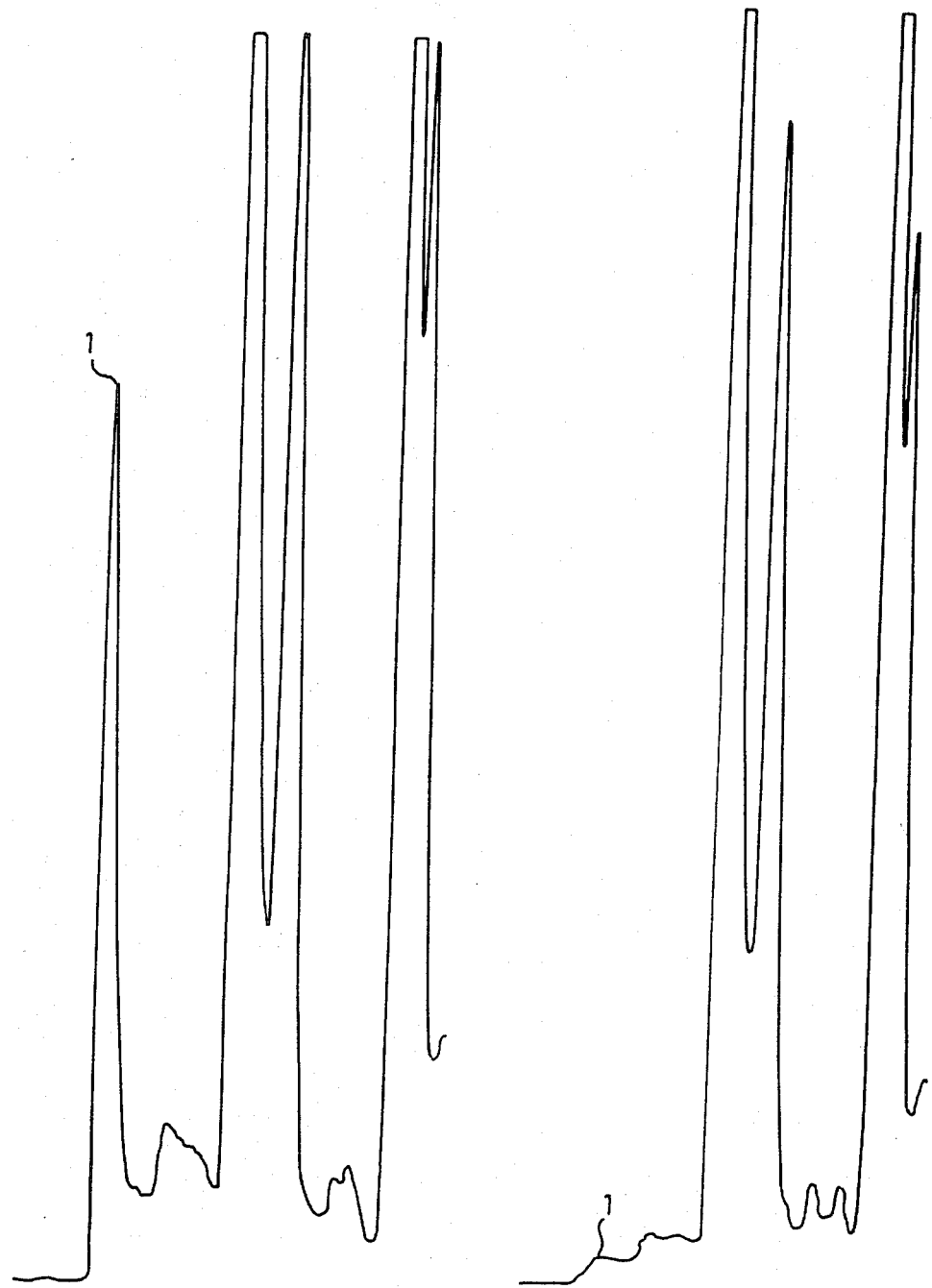

The process according to the invention consists in adjusting the pH of the milk serum product to within a pH range of from about 4.3 to 5.0, causing coagulation in this milk serum with its adjusted pH under conditions such that a milk casein substance coagulates in this pH range, and adding a milk casein substance with a pH of less than about 3.5, then separating the coagulated product from the treated milk serum.

Whereas before milk serum has been obtained by separating the coagulum and milk serum contained in the milk by effecting coagulation, the apparently irrational idea of the invention is to add a milk casein substance, which is therefore liable to coagulate, to the milk serum, which would seem to cancel out all the benefit of the prior treatment which will have to be begun again. However, as this coagulation treatment is started again under the conditions specified according to the process of the invention and in the presence of the particular milk casein substance specified, it is surprisingly found that the milk serum separated by this second coagulation is delipidated by a phenomenon in which the lipids are picked up by the coagulated casein and the milk serum is freed from some of the microorganisms therein.

The first stage of the process according to the invention consists in adjusting the pH of the milk serum product to within a pH range of from about 4.3 to 5.0, preferably from 4.5 to 4.8.

This adjustment may be made by the addition of an acid, particularly hydrochloric or sulphuric acid, or by acidification by fermentation. However, the pH of the milk serum product is preferably adjusted by mixing it with milk serum which has previously been decationised with the aid of a cationic resin in H form.

The milk serum product may be brought to a state in which a milk casein substance will coagulate by heating it, preferably to between 40° and 55° C., whilst the milk casein substance added, which is more particularly in acid milk or an acid caseinate, is preferably prepared by acidulation at least partly on a cationic resin of H form. This acidic milk or caseinate preferably has a pH of between about 1.8 and 3.4. Interesting results in terms of delipidation have been obtained by adding only 2% by weight of milk casein substance based on the weight of milk serum product which is to be delipidated. Preferably, about 5% are added. It is possible to add more but the degree of delipidation obtained is no better. For this reason, it is not economically desirable to exceed a proportion of milk casein substance of 40%, preferably 25%.

The separation of the coagulated product and treated milk serum may be carried out by any conventional method, especially centrifuging. The coagulated protein product is found to have a high lipid content exceeding 2 to 20%.

The following examples illustrate the invention.

EXAMPLE 1

A cheese-making serum has a pH of 6.22 and a fat content of 0.35 gram per liter. 30 parts by volume of this serum is passed over a cationic resin of H form so as to obtain a pH of 1.7. These 30 parts are mixed with 70 parts of the original serum. In this way the pH is adjusted to 4.82.

All the serum is heated to 48° C. and 5% of milk which has previously been acidulated to a pH of 1.92 by cation exchange on a resin of H form is added abruptly thereto. Sudden coagulation occurs. The mixture is kept at 45° C. for 2 minutes and then centrifuged. A whitish precipitate is obtained, with a lipid content of 20%, and a translucent clear liquid is obtained which is the delipidated milk serum.

The serum is subjected to ultrafiltration until a concentrate containing 65% of dry matter is obtained. The pH is adjusted to 6.2 and the concentrate is dried.

The moisture content of the dried concentrate is 3.75% by weight. The protein content is 68.9%. The mineral content is 3.10%, whereas the fat content is only 0.27%. By contrast, the lactose content is estimated at 23.98%. The lipoprotein content is determined by high pressure liquid chromatography (at 18 bars) with a tris P buffer corresponding to a pH of 6.8 on a T SK 3,000 column in a Varian 5.010 apparatus. In FIG. 2, the first peak 1 corresponds to the lipoproteins.

COMPARATIVE EXAMPLE 1

The starting serum in Example 1 is subjected directly to ultrafiltration to provide a comparative concentrate X. The moisture, protein, mineral, fat and lactose contents are 3.80%, 68.00%, 3.4%, 5.9% and 18.9%, respectively.

FIG. 1 shows the chromatogram obtained. The first peak 1 corresponds to the lipoproteins.

Microbe counts show that there is a reduction of more than 75% in the number of microorganisms present in the milk serum obtained in Example 1 compared with the starting serum.

We claim:

1. Process for treating a milk serum product in order to delipidate it and free it from microorganisms, which comprises adjusting the pH of the milk serum product to a pH in the range of from about 4.3 to 5.0, causing coagulation in the pH-adjusted milk serum product by heating it to a temperature at which a milk casein substance will coagulate within the adjusted pH range and adding, to the pH-adjusted milk serum product a milk casein substance having a pH of less than about 3.5, and then separating the coagulated material from the treated milk serum product.

2. Process as claimed in claim 1, which comprises adjusting the pH of the milk serum product by mixing it with milk serum which has previously been decationised by means of a cationic resin of H form.

3. Process as claimed in claim 1 which comprises subjected the milk serum product to conditions in which a milk casein substance will coagulate by heating the milk serum product to between 40° and 55° C.

4. Process as claimed in claim 1, which comprises adding at least 2% by weight of milk casein substance based on the weight of milk serum product.

5. Process as claimed in claim 4, which comprises adding less than 40% by weight of milk casein substance based on the weight of milk serum.

6. Process as claimed in claim 1, which comprises adding acid milk or an acid caseinate as the milk casein substance.

7. Process as claimed in claim 1, which comprises using a milk casein substance having a pH of less than 3.5 prepared by acidulation, at least partly on a cationic resin of H form.

* * * * *